United States Patent [19]

Dransfield et al.

[11] Patent Number: 5,320,675
[45] Date of Patent: Jun. 14, 1994

[54] STABILIZED METAL OXIDES

[75] Inventors: Graham P. Dransfield; Terence A. Egerton, both of Stockton on Tees, England

[73] Assignee: Tioxide Group Services Limited, London, England

[21] Appl. No.: 945,932

[22] Filed: Sep. 17, 1992

[30] Foreign Application Priority Data

Oct. 1, 1991 [GB] United Kingdom ............... 9120780

[51] Int. Cl.$^5$ ........................... C08K 3/00; B05D 7/00; C04B 35/48
[52] U.S. Cl. ..................... 106/450; 427/215; 501/103
[58] Field of Search ............ 106/450; 427/215; 501/103

[56] References Cited

U.S. PATENT DOCUMENTS

| | | | |
|---|---|---|---|
| 3,514,252 | 5/1970 | Levy, Jr. et al. | 106/450 |
| 4,491,482 | 1/1985 | Hori | 106/450 |
| 4,820,593 | 4/1989 | Egerton et al. | 428/698 |
| 4,851,293 | 7/1989 | Egerton et al. | 501/103 |
| 4,985,379 | 1/1991 | Egerton et al. | 501/103 |

FOREIGN PATENT DOCUMENTS

| | | |
|---|---|---|
| 0167723 | 4/1985 | European Pat. Off. . |
| 0214291 | 7/1985 | European Pat. Off. . |
| 61-72683 | 4/1986 | Japan . |
| 1636398 | 3/1991 | U.S.S.R. . |
| 2234500 | 5/1990 | United Kingdom . |

*Primary Examiner*—Helene Klemanski
*Attorney, Agent, or Firm*—Baker & Botts

[57] ABSTRACT

A composition suitable for use in the manufacture of ceramics comprises particulate zirconia the particles of which are coated with a hydrous oxide of yttrium and a hydrous oxide of manganese, iron, cobalt, nickel, copper or zinc. Preferably the particles also have an inner coating of titania, zirconia, hafnia or alumina.

Ceramics prepared from the particulate zirconia of the invention are resistant to degradation by water at temperatures above 100° C.

33 Claims, No Drawings

STABILIZED METAL OXIDES

This invention relates to stabilized metallic oxides and particularly to those stabilized by coating with a hydrous yttrium oxide.

Zirconium oxide is used in the manufacture of ceramic materials and during such manufacture the oxide is heated during which the crystal form of the oxide changes from the normal room temperature monoclinic habit to tetragonal and cubic forms depending on the temperature to which the oxide is heated. Under normal conditions only the monoclinic form of pure zirconia is stable at room temperature and unless steps are taken to stabilize the tetragonal or cubic forms these revert to the monoclinic form on cooling.

The presence of at least some of these high temperature tetragonal and cubic crystal habits is desirable in ceramics and steps have been taken in the past to improve the stability of these crystalline forms at room temperature. Such steps have included mixing the zirconia with a stabilizing agent which becomes incorporated in the zirconia on heating the doped oxide and exerts a stabilizing influence on the crystal formed when it is cooled to room temperature.

One stabilizing agent which has been used is yttrium oxide and a number of methods have been described for forming an intimate mixture of zirconia and yttria suitable for use in the manufacture of a ceramic material.

A problem which has been noted with ceramics prepared from zirconia stabilised with yttrium oxide is that the high strength produced intially is reduced by exposure to water at high temperature. This reduction in strength which herein is referred to as aqueous degradation limits the usefulness of yttria-stabilized zirconia ceramics in applications involving exposure to water at high temperature.

It is an object of the present invention to provide a form of zirconia suitable for use in the manufacture of ceramics which have an increased resistance to aqueous degradation.

According to the present invention a composition suitable for use in the manufacture of a ceramic material comprises particulate zirconia in which the particles are coated with a hydrous oxide of yttrium and a hydrous oxide of manganese, iron, cobalt, nickel, copper or zinc.

The compositions of the invention are easily sintered to form strong ceramic materials having good resistance to aqueous degradation.

According to the invention also a method of preparing a composition suitable for use in the manufacture of a ceramic material comprises coating particles of zirconia with a hydrous oxide of yttrium and with a hydrous oxide of manganese, iron, cobalt, nickel, copper or zinc.

One preferred process comprises forming an acidic aqueous dispersion of zirconia particles, adding to the dispersion a water-soluble hydrolysable compound of yttrium and a water-soluble hydrolyzable compound of manganese, iron, cobalt, nickel, copper or zinc and increasing the pH of the dispersion to form on the zirconia particles a coating comprising a mixture of hydrous oxides of yttrium and at least one of the aforementioned metals.

The yttrium oxide may be present as one layer with the oxide of the other metal forming a distinct layer or there may be present only one layer comprising a mixture of yttrium oxide with metal oxide.

Other inorganic oxides may also be present as a coating on the surface of the zirconia particles and in a preferred embodiment the zirconia particles are coated with an inner coating of hydrous titania, zirconia, hafnia or alumina or a mixture of these surrounded by an outer coating or coatings of yttrium oxide and an oxide of manganese, iron, cobalt, nickel, copper or zinc.

Particularly useful products comprise particulate zirconia having a size such that the majority of the particles have a diameter of less than or equal to 0.5 microns and preferably less than or equal to 0.2 microns.

The amount of the hydrous oxide of yttrium employed depends upon the degree of stabilization that it is desired should be imparted to the fired ceramic. Generally speaking the amount of the hydrous yttrium oxide present as coating will be less for a partially stabilized product than for a fully stabilized product. For a fully stabilized zirconia it has been found useful to provide in the coating from about 10 to about 20% by weight hydrous oxide of yttrium expressed as $Y_2O_3$ based on weight of zirconia. Generally, however, for optimum toughness a partially stabilized zirconia is preferred and a suitable composition has a coating of from about 2 to about 10% by weight hydrous oxide of yttrium expressed as $Y_2O_3$ based on weight of zirconia. Preferably the coating has from about 3 to 8% by weight hydrous oxide of yttrium and most preferably the amount of hydrous yttrium oxide is from about 3 to about 6% by weight.

The amount of hydrous oxide of manganese, iron, cobalt, nickel, copper or zinc present is preferably from about 0.01 to about 4 molar %, more preferably from about 0.01 to about 2.0 molar % and most preferably from about 0.05 to about 1 molar % expressed as Mn, Fe, Co, Ni, Cu or Zn based on zirconia.

In accordance with the invention the particulate zirconia used to form the basis of the material to be used as a ceramic is preferably formed by the vapor phase oxidation/hydrolysis of a vaporized zirconium compound. Typical zirconium compounds which can be oxidized or hydrolyzed in the vapor state are the zirconium halides, particularly zirconium tetrachloride and zirconium alkoxides. This is usually carried out by mixing the zirconium compound with an excess of heated oxygen or water vapor under such conditions that oxidation or hydrolysis of the zirconium tetrachloride takes place and the desired sized zirconia is obtained directly on cooling and separating from the gas stream. A preferred method of heating oxygen to react with the zirconium tetrachloride is to pass the oxygen through an electric arc between two electrodes supplied with electrical power at an appropriate voltage and amperage which commonly generates a so-called electrical plasma. This form of manufacture of the particulate zirconia has an advantage in that the product is obtained in the oxide form directly and that the oxidation process can be controlled so that the particle size of the product is as near to the crystal size as it is possible to obtain without extensive grinding of the product being required before treatment with the coating agents.

The product of the invention is obtained by treating the particulate zirconia in such a manner that the hydrous oxides are deposited as coatings on the surface of the particles of zirconia. Preferably the coating operation is carried out as a wet treatment process in which, initially, the zirconia particles are dispersed in water. It has been found that this dispersion can be effected directly by mixing the particles of zirconia with water without there being any requirement for a dispersing agent. This is advisable because it avoids any unnecessary contamination of the product with constituents of the dispersing agent. Generally speaking zirconia obtained from the vapour phase oxidation of the zirconium halide is highly acidic when mixed with water and depending on the exact form of the particles of zirconia can produce a dispersion pH of the order of 1 clearly indicating the highly acidic dispersions. It is sometimes preferable to commence the coating process with a zirconia dispersion having a higher pH. In such a process the pH of zirconia dispersion is adjusted to the desired pH before the water soluble compounds which are precursors for the hydrous oxides are added.

As described the dispersion of the zirconia particles in water is effected normally by stirring with water in an amount such that the obtained dispersion contains zirconia in a concentration of up to 400 gpl. Usually the amount of zirconia is not less than 50 gpl zirconia and a convenient concentration to employ in practice is 200 gpl of zirconia. It is possible to improve the degree of dispersion by milling in, for example, a sand mill if desired.

To the aqueous dispersion of the particulate zirconia there is added a water soluble hydrolyzable compound of yttrium in an amount sufficient to introduce on hydrolysis the required amount of hydrous oxide as a coating. Examples of water soluble hydrolyzable compounds of yttrium which can be used include yttrium sulphate, yttrium chloride and yttrium nitrate. When it is desired to form a mixed coating of hydrous yttrium oxide together with a hydrous oxide of manganese, iron, cobalt, nickel, copper or zinc then a water soluble hydrolyzable compound of at least one of these metals is also added to the zirconia slurry. Water soluble hydrolyzable compounds which can be used include chlorides, sulphates and nitrates of these metals.

Any suitable means of mixing the aqueous dispersion of zirconia with the hydrolyzable metal compounds can be used and a range of temperatures may be employed although it is preferred that the coating process be carried out at a temperature of from 10° C. to 70° C.

After mixing of the hydrolyzable metal compounds with the aqueous dispersion of zirconia, the pH of the dispersion is adjusted to precipitate the coating of hydrous oxides of yttrium and manganese, iron, cobalt, nickel, copper or zinc. The pH to which the dispersion is adjusted is from 3 to 12 and preferably from 7 to 10.

The neutralization and increase in pH of the acidic aqueous dispersion either before or during the precipitation of the hydrous oxides preferably is carried out by the addition of an appropriate alkali to the aqueous dispersion. It is most convenient if the alkali is ammonium hydroxide since this does not introduce any objectionable metallic ions into the solution and waste ammonia can be driven off by heating. Stronger alkali such as an alkaline metal hydroxide can be used such as sodium hydroxide or potassium hydroxide. However when such alkaline metal hydroxides are used it is necessary to wash the product adequately to remove any contaminating alkali metal ions. Normally the product obtained should not contain an alkali metal impurity level greater than 0.01% by weight expressed as $M_2O$.

After deposition of the hydrous oxide coating the product is separated usually by filtering, washing as necessary and drying. If required and dried product may be ground or milled to remove any aggregation that has occurred during processing.

In an alternative process the pH of a mixture of a water soluble hydrolyzable compound of yttrium with an aqueous slurry of zirconia is adjusted to deposit a coating of hydrous yttrium oxide on the zirconia particles and these coated particles are subsequently coated with a layer of hydrous oxide of manganese, iron, cobalt, nickel, copper or zinc by precipitation of the hydrous oxide from an aqueous solution of a hydrolyzable compound of the respective metal substantially as described hereinbefore.

In a particularly preferred embodiment there is also provided on the zirconia particles an inner coating of a hydrous oxide of titanium, zirconium, hafnium or aluminum. This coating can be provided in substantially similar manner to that employed for producing coatings of the other hydrous metal oxides by hydrolysis of water soluble compounds such as titanyl sulphate, titanyl aluminum sulphate, titanium oxychloride, zirconium chloride, zirconium sulphate, hafnium chloride, aluminum sulphate, aluminum nitrate or sodium aluminate. The coating with a hydrous oxide of titanium, zirconium, hafnium or aluminum may be effected before addition of the hydrolysable compounds of yttrium and manganese, iron, cobalt, nickel, copper or zinc but the coating process preferably involves mixing the zirconia slurry firstly with a hydrolysable compound of titanium, zirconium, hafnium or aluminum and secondly with a hydrolyzable compound of yttrium and a hydrolyzable compound of manganese, iron, cobalt, nickel, copper or zinc.

The powdered product is eminently suitable for use in the manufacture of shaped ceramic bodies by firing.

The product in having the hydrous yttrium oxide stabilizing agent and the hydrous oxide of manganese, iron, cobalt, nickel, copper or zinc present as a coating provides a well distributed and intimate mixture of these oxides and on firing good incorporation of the oxides through the zirconia is achieved.

The use of hydrous oxide of manganese, iron, cobalt, nickel, copper or zinc together with the hydrous yttrium oxide enables the production of zirconia-based ceramics with an improved resistance to aqueous degradation compared to those produced with a similar amount of yttrium oxide in the absence of at least one of these oxides. The resistance to aqueous degradation can be demonstrated by measuring the strength of samples of ceramics after exposure to water under pressure at, for example, 180° C. The invention provides a particularly convenient starting component for use in these ceramics.

The invention is illustrated by the following Examples.

EXAMPLE 1

Zirconia particles of approximately 0.1 micron diameter prepared by vapor phase oxidation of zirconium tetrachloride were dispersed in water at a concentration of 200 grams per liter. As a result of the reaction of residual Zr-Cl groups with the water the dispersion obtained had a pH value of 1.

An aqueous solution of acid zirconium sulphate (containing the equivalent of 100 grams per liter $ZrO_2$) was added to the dispersion in an amount sufficient to introduce hydrous zirconia in an amount of 1% by weight of $ZrO_2$ on solids. To the dispersion so obtained sufficient aqueous solution of yttrium chloride (containing the equivalent of 180 grams per liter Y$_2$O$_3$) to introduce 4.7% by weight Y$_2$O$_3$ based on solids was added followed by sufficient aqueous solution of copper (II) sulphate to introduce 0.07% by weight CuO based on solids. The pH was then raised by the addition of aqueous sodium hydroxide over a period of 10 minutes to a value of 8.0 and the dispersion stirred for a further 30 mins at room temperature.

The coated zirconia was then separated by filtration, washed with deionised water and dried at 110° C.

EXAMPLE 2

Zirconia particles similar to those used in Example 1 were coated with zirconia, yttria and iron oxides in a manner similar to that used in Example 1 except that, in place of the copper (II) sulphate, an amount of iron (II) sulphate sufficient to introduce 0.25% by weight FeO based on solids was used. After coating the zirconia was separated by filtration, washed with deionised water, and dried at 110° C.

Testing of Products

Portions of coated zirconia produced as described in Examples 1 and 2 were formed into discs of approximately 30 mm diameter by single ended die-pressing at 30 MPa. Discs were also prepared for comparison from zirconia bearing a coating of zirconia and yttria produced by a method similar to that used in Examples 1 and 2 but without the addition of either copper or iron salt. (Control).

The discs were fired at 1300° C., their surfaces polished and the strength (Modulus of Rupture) of 10 discs was measured by a three-point biaxial flexure test.

Batches of 10 sintered discs were immersed in distilled water in an autoclave at 180° C. and a pressure of 10.0 bar, following the method of Nakajima et al, Advances in Ceramics, Vol. 12 pages 399-403 (1984) to determine their resistance to aqueous degradation.

Strength measurements were made on the exposed samples using a three-point biaxial flexure test, values obtained being on single samples. Results are given below in Table 1.

TABLE 1

| Exposure Time | Fracture Strength (MPa) | | |
|---|---|---|---|
| (hrs) | Control | EXAMPLE 1 | EXAMPLE 2 |
| 0 | 1444 | 1368 | 1558 |
| 4 | 1170 | 1440 | 1523 |
| 24 | 1229 | 1200 | 1346 |
| 50 | 1165 | 1218 | 1426 |
| 100 | 1285 | 1279 | 1473 |
| 200 | 1057 | 1207 | 1408 |
| 320 | 826 | 1131 | 1374 |
| 500 | 131 | 1167 | 1355 |
| 1000 | 51 | 1119 | 1421 |

These results demonstrate the ability of ceramic bodies prepared from powders produced according to Example 1 or Example 2 to resist aqueous degradation. This resistance is an improvement by comparison with the control sample which represents a ceramic considered to possess good resistance to aqueous degradation.

We claim:

1. A composition suitable for use in the manufacture of a ceramic material comprising particulate zirconia in which the particles are coated with a hydrous oxide of yttrium, a hydrous oxide of a metal selected from the group consisting of manganese, iron, cobalt, nickel, copper and zinc, and a hydrous inorganic oxide selected from the group consisting of hydrous titania, zirconia, hafnia and alumina.

2. A composition according to claim 1 in which the majority of the particles have a diameter of not greater than 0.5 micron.

3. A composition according to claim 2 in which the diameter is not greater than 0.2 micron.

4. A composition according to claim 1 in which the amount of hydrous oxide of yttrium present on the particles is from about 10% to about 20% by weight hydrous oxide of yttrium expressed as Y$_2$O$_3$ based on weight of zirconia.

5. A composition according to claim 1 in which the amount of hydrous oxide of yttrium present on the particles is from about 2% to about 10% by weight hydrous oxide of yttrium expressed as Y$_2$O$_3$ based on weight of zirconia.

6. A composition according to claim 5 in which the amount of hydrous oxide of yttrium is from about 3% to about 8% by weight.

7. A composition according to claim 5 in which the amount of hydrous oxide of yttrium is from about 3% to about 6% by weight.

8. A composition according to claim 1 in which the amount of hydrous oxide of manganese, iron, cobalt nickel, copper or zinc present on the particles is from about 0.01 molar % to about 4.0 molar % expressed as Mn, Fe, Co, Ni, Cu or Zn based on zirconia.

9. A composition according to claim 8 in which the amount of hydrous oxide of manganese, iron, cobalt, nickel, copper or zinc is from about 0.01 molar % to about 2.0 molar %.

10. A composition according to claim 8 in which the amount of hydrous oxide of manganese, iron, cobalt, nickel, copper or zinc is from about 0.05 molar % to about 1.0 molar %.

11. A composition according to claim 1 in which the coating of hydrous titania, zirconia, hafnia or alumina forms an inner coating on the zirconia particles and the yttrium oxide and oxide of manganese, iron, cobalt, nickel, copper or zinc form an outer coating.

12. A composition according to claim 1 in which the hydrous yttrium oxide is present as a separate layer distinct from the layer of hydrous oxide of manganese, iron, nickel, copper or zinc.

13. A composition according to claim 1 in which the particulate zirconia is formed by a step selected from the group consisting of vapor phase oxidation of a vaporized zirconium compound, hydrolysis of a vaporized zirconium compound, or mixtures of these steps.

14. A composition according to claim 13 in which the oxidation is carried out by oxidising zirconium tetrachloride with oxygen which has been heated by means of an electric plasma.

15. A composition according to claim 1 which contains less than 0.01% by weight alkali metal impurity expressed as M$_2$O.

16. A process for preparing a composition suitable for use in the manufacture of a ceramic material comprising coating particles of zirconia with a hydrous oxide of yttrium, a hydrous oxide of a metal selected from the group consisting of manganese, iron, cobalt, nickel, copper and zinc, and with a hydrous inorganic oxide selected from the group consisting of hydrous titania, zirconia, hafnia and alumina.

17. A process according to claim 16 in which the coating is carried out as a wet treatment process and the zirconia particles are dispersed in water.

18. A process according to claim 17 in which the dispersion of zirconia particles formed is acidic.

19. A process according to claim 17 in which the concentration of zirconia in the dispersion is up to 400 grams per liter.

20. A process according to claim 19 in which the concentration is from 50 to 400 grams per liter.

21. A process, according to claim 17 in which the degree of dispersion is improved by milling.

22. A process according to claim 17 in which the coating of hydrous yttrium oxide is formed by adding a water soluble hydrolysable compound of yttrium to the dispersion and adjusting the pH of the dispersion.

23. A process according to claim 22 in which the water soluble yttrium compound is selected from the group consisting of yttrium chloride, yttrium sulphate and yttrium nitrate.

24. A process according to claim 17 in which the coating of hydrous oxide of manganese, iron, cobalt, nickel, copper or zinc is formed by adding a water soluble hydrolysable compound selected from the group consisting of compounds of manganese, iron, cobalt, nickel, copper and zinc to the dispersion and adjusting the pH of the dispersion.

25. A process according to claim 24 in which the water soluble compound of manganese, iron, cobalt, nickel, copper or zinc is selected from the group consisting of chlorides, sulphates and nitrates.

26. A process according to claim 22 in which the water soluble compound of yttrium and the water soluble compound of manganese, iron, cobalt, nickel, copper or zinc are added to the dispersion before the pH is adjusted.

27. A process according to claim 17 in which the coating process is carried out at a temperature of from 10° C. to 70° C.

28. A process according to claim 22 or 24 in which the pH is adjusted to from 3 to 12.

29. A process according to claim 22 or 26 in which the pH is adjusted to from 7 to 10.

30. A process according to claim 22 or 26 in which the pH is adjusted with ammonia.

31. A process according to claim 17 in which an inner coating of a hydrous oxide of titanium, zirconium, hafnium, or aluminum is formed on the particles of zirconia by adding a water soluble hydrolysable compound selected from the group consisting of compounds of titanium, zirconium, hafnium and aluminum to the dispersion and adjusting the pH of the dispersion.

32. A process according to claim 31 in which the water soluble compound of titanium, zirconium, hafnium or aluminum is selected from the group consisting of titanyl sulphate, titanyl aluminum sulphate, titanium oxychloride, zirconium chloride, zirconium sulphate, hafnium chloride, aluminum sulphate, aluminum nitrate or sodium aluminate.

33. A ceramic article formed from particulate zirconia the particles of which have been coated with a hydrous oxide of yttrium, a hydrous oxide of a metal selected from the group consisting of manganese, iron, cobalt, nickel, copper and zinc, and with a hydrous inorganic oxide selected from the group consisting of hydrous titania, zirconia, hafnia and alumina.

* * * * *